US008638688B2

(12) United States Patent
Lekutai et al.

(10) Patent No.: US 8,638,688 B2
(45) Date of Patent: Jan. 28, 2014

(54) METHOD AND APPARATUS FOR ALLOCATION OF RADIO RESOURCES

(75) Inventors: Gaviphat Lekutai, Kirkland, WA (US); Venson M. Shaw, Kirkland, WA (US); Donald C. Hjort, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1007 days.

(21) Appl. No.: 12/015,808

(22) Filed: Jan. 17, 2008

(65) Prior Publication Data
US 2008/0240045 A1 Oct. 2, 2008

Related U.S. Application Data

(60) Provisional application No. 60/909,303, filed on Mar. 30, 2007.

(51) Int. Cl.
*H04J 3/14* (2006.01)
(52) U.S. Cl.
USPC .............................. 370/253; 370/329; 370/342
(58) Field of Classification Search
None
See application file for complete search history.

(56) References Cited

U.S. PATENT DOCUMENTS

| 7,603,697 | B1 * | 10/2009 | Kupsh et al. ..................... 726/2 |
| 7,957,347 | B1 * | 6/2011 | Loc et al. ..................... 370/329 |
| 2004/0030705 | A1 * | 2/2004 | Bowman-Amuah .......... 707/100 |
| 2004/0208120 | A1 * | 10/2004 | Shenoi ..................... 370/229 |
| 2005/0141450 | A1 * | 6/2005 | Carlton et al. .................. 370/329 |
| 2007/0038588 | A1 * | 2/2007 | Sullivan et al. .................. 706/25 |
| 2007/0195788 | A1 * | 8/2007 | Vasamsetti et al. ....... 370/395.21 |
| 2008/0159175 | A1 * | 7/2008 | Flack ............................ 370/257 |
| 2008/0274747 | A1 * | 11/2008 | Ludwig et al. ................. 455/450 |

FOREIGN PATENT DOCUMENTS

| EP | 1672853 A2 | 6/2006 |
| WO | WO03021467 A1 | 3/2003 |
| WO | WO2005060127 A1 | 6/2005 |
| WO | WO2007010163 A2 | 1/2007 |

OTHER PUBLICATIONS

International Search Report mailed Jul. 31, 2008 for International Application No. PCT/US2008/058700, 10 pages.
Ericsson, "Basic Concepts of WCDMA Radio Access Network," White Paper, Ericsson Radio Systems AB 2001, pp. 1-10.
Wikipedia, "LimeWire," URL:<http://en.wikipedia.org/wiki/LimeWire>, Jan. 18, 2008, 4 pages.
USA Today, "YouTube serves up 100 million videos a day online," URL: <www.usatoday.com/tech/news/2006-07-16-youtube-viewsx.htm>, Jul. 16, 2006 2 pages.
Baset, Salman A. and Schulzrinne, Henning, "An Analysis of the Skype Peer-to-Peer Internet Telephony Protocol," Technical Report, Columbia University, Sep. 14, 2004, 12 pages.

(Continued)

*Primary Examiner* — Jae Y. Lee
*Assistant Examiner* — Tito Pham
(74) *Attorney, Agent, or Firm* — Abel Law Group, LLP

(57) ABSTRACT

Characteristics of an unknown application on the wireless network are compared with characteristics of previously classified wireless applications. When the characteristics of the unknown application match those of a previously classified application, the bandwidth requirement associated with the matching previously classified application is allocated to the unknown application by the wireless network.

20 Claims, 4 Drawing Sheets

(56) References Cited

OTHER PUBLICATIONS

TESTfactory, Listening Test Report for Ingenieurburo Peter Bengel (IPB), Sony Europe BV, Stuttgart, <www.minidisc.org/keep/TESTfactory_Listening_test.pdf> Feb. 27, 2003, 11 pages.

3GPP TS 23.107 3rd Generation Partnership Project;Technical Specification Group Services and System Aspects; Quality of Service (QoS) concept and architecture (Release 7), V7.1.0 (Sep. 2007), URL <http://www.3gpp.org/ftp/Specs/html-info/23107.htm>, 40 pages.

3GPP TS 23.107 3rd Generation Partnership Project;Technical Specification Group Services and System Aspects; Quality of Service (QoS) concept and architecture (Release 6), V6.4.0 (Mar. 2006), URL <http://www.3gpp.org/ftp/Specs/html-info/23107.htm>, 40 pages.

* cited by examiner

| | 3G Avg. Speed (kbps) | | 2.5G Avg. Speed (kbps) | |
|---|---|---|---|---|
| Wireless Applications | DL | UL | DL | UL |
| Skype VoIP | 19.4 | 26.5 | 27.9 | 17.1 |
| iTunes Radio 64k | 67.4 | 1.6 | 65.8 | 1.5 |
| iTunes Radio 96k | 106.3 | 2.7 | 102.9 | 2.3 |
| iTunes Radio 128k | 130.7 | 3.2 | 114.8 | 2.8 |
| Sling Player (2min) | 357.3 | 9.3 | 169.7 | 4.7 |
| Limewire P2P MP3 (4MB) | 383.4 | 19.8 | 135.5 | 6.7 |
| YouTube Video Streaming | 482.6 | 13.1 | 151.5 | 4.0 |
| CNN Video Streaming | 527.2 | 10.9 | 80.3 | 3.3 |
| Sony Music (4MB) | 763.6 | 16.2 | 182.9 | 4.4 |

*FIG. 2*

METHOD AND APPARATUS FOR ALLOCATION OF RADIO RESOURCES

CROSS-REFERENCE TO RELATED APPLICATION(S)

This application claims benefit under 35 U.S.C. §119(e) of provisional application 60/909,303, filed Mar. 30, 2007, which application is incorporated herein by reference in its entirety.

BACKGROUND

1. Field of the Invention

This invention relates to allocation of radio resources in a wireless system and more particularly to allocation of radio resources based on classification of wireless applications.

2. Description of the Related Art

The rapid advancement of the mobile communications and the market proliferation of multimedia applications have been key driving factors for the mobile operators to deliver real time video and audio information services to the mobile devices. While not exclusively mobile, according to published reports, 100 million YouTube™ clips are viewed daily with additional 65,000 new videos uploaded every day, and nearly 20 million unique users per month. The number of mobile users of such services can be expected to grow significantly. As use of mobile technology continues to evolve and demands on the network grow with widespread adoption of video and other mobile applications, proper allocation of limited wireless resources grows in importance.

SUMMARY

Accordingly, embodiments of the invention provide improved radio resource allocation in wireless networks. An embodiment compares characteristics of an unknown application on the wireless network with characteristics of previously classified wireless applications. When the characteristics of the unknown application match those of a previously classified application, the bandwidth requirement of the matching previously classified application is allocated to the unknown application by the wireless network.

In an embodiment, a method is provided for use in a wireless network that includes determining at least one characteristic of an unknown wireless application that is currently utilizing the wireless network. The method further includes determining a match of the at least one characteristic of the unknown wireless application to at least one characteristic of one of a plurality of previously classified wireless applications and allocating radio resources in the wireless network according to the match. In an embodiment, the at least one characteristic is at least one of uplink and downlink throughput. In an embodiment, the characteristic includes a destination, source, or port number associated with the unknown wireless application.

In another embodiment, a wireless network is provided that includes characteristic analyzer functionality that is operable to determine at least one characteristic of an unknown wireless application that is utilizing the wireless network. The wireless network also includes a match unit operable to determine a match between the at least one characteristic of the unknown wireless application to at least one characteristic of one of a plurality of previously classified wireless applications; and a radio resource allocator unit operable to allocating radio resources in the wireless network according to the match.

BRIEF DESCRIPTION OF THE DRAWINGS

The present invention may be better understood, and its numerous objects, features, and advantages made apparent to those skilled in the art by referencing the accompanying drawings.

FIG. 2 shows a table having numerical values of the data shown in FIGS. 1A and 1B of the average throughput for various applications.

Note that the use of the same reference symbols in different drawings indicates similar or identical items.

DESCRIPTION OF THE PREFERRED EMBODIMENT(S)

Figure 1A:
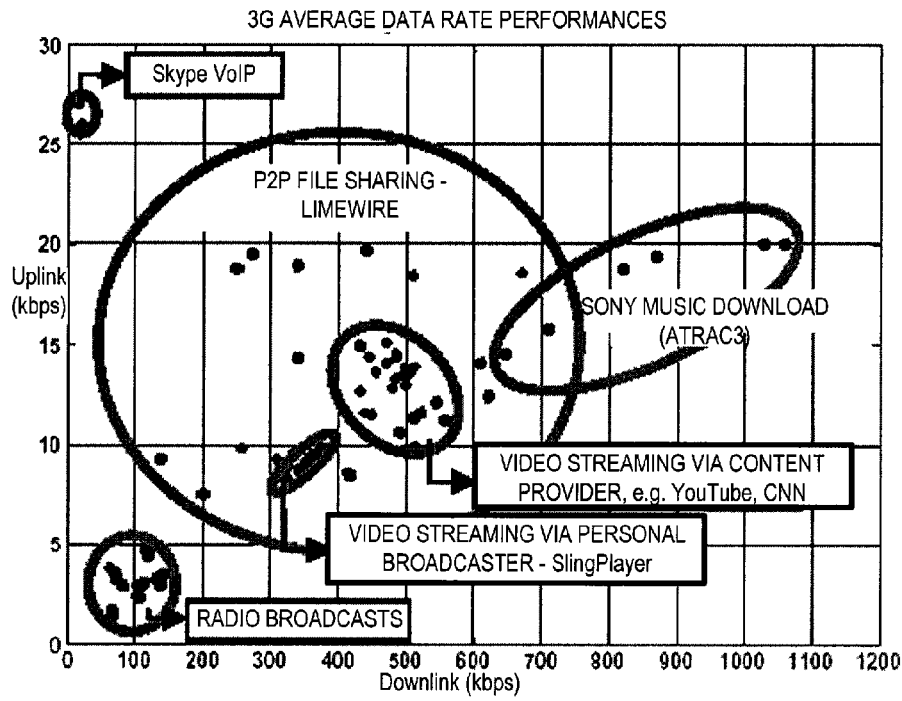
FIG. 1A illustrates exemplary measured average downlink and uplink performances based on sampled applications under various RF conditions for a 3G wireless network.

As internet applications become increasingly popular together with upward trends on wireless data usage, it is necessary to prioritize the different wireless services according to the requirements of the different wireless services. An embodiment of the invention more efficiently allocates radio resources in the RAN (radio access network) that are becoming increasingly scarce as data applications gain a greater share of wireless services. In an embodiment of the invention the 3G RAN or 2G Base Station Controller (BSC) allocates its bandwidth for interacting with the mobiles based on the requirements of the application being utilized by the mobile. Currently, there is no proper mechanism in the RAN to allocate radio access bearer (or time slots in 2G) based on the data rate requirements of data applications. In an embodiment, that is accomplished by fingerprinting or identifying characteristic(s) of a large number of (or the most frequently used) mobile applications and determining the radio resource requirements of the application. When an unknown application is being utilized on the network, its characteristics can be matched with the predetermined requirements of identical or similar wireless applications.

Existing approaches to allocation of bandwidth includes prioritization based on Quality of Service (QoS) differentiation. 3GPP (3rd Generation Partnership Project) has defined four quality classes of Radio Access Bearers (RAB). The first quality class is conversations, which is used for voice telephony and has low delay and strict ordering. The second quality class is streaming, used, e.g., in wireless video applications and has moderate delay and strict ordering. A third quality class is interactive, used for web browsing, and has moderate delay. A fourth quality class is background, used for file downloads, email, etc., and has no delay requirements. Each of the QoS types is identified by a specific Differentiated Services Code Point (DSCP) value in the IP packet so the QoS type can be easily identified for charging purposes.

Table 1 below shows a mapping of QoS type (specified as a combination of Traffic Class and Priority) as defined by 3GPP in specification TS22.107 onto different types of services.

TABLE 1

3GPP QoS Mapping

| QoS Type | | Services Supported |
|---|---|---|
| Traffic Class | Priority | (examples) |
| Conversational | N/A | Voice over IP |
| | | Video Calls |
| Streaming | N/A | Audio streaming |
| | | Video streaming |
| Interactive | 1 | Transactional Services |
| | 2 | Web Browsing |
| | 3 | Instant Messaging |
| Background | N/A | E-mail |
| | | File download (FTP session) |

Note that QoS is typically allocated to users based on what the user pays for service. Thus, a higher paying user will be guaranteed a particular QoS level.

One way that radio resources are allocated in the wireless network is as follows. Universal Mobile Telecommunication System (UMTS) allocates data rate according to its radio access bearer (RAB) based on the Orthogonal Variable Spreading Factor (OVSF) code tree. For example, the highest level of the code tree (Spreading Factor, SF=8) offers a 384 kilobits per second (kbps) data rate, but only 7 simultaneous users can access SF8 at one time (maximum of eight SF8 links with one SF8 link used for control). The next level is SF16 which allows maximum of 15 simultaneous users at 128 kbps at one time with one link used for control. SF16 is followed by SF32, SF64, SF128, SF256, which correspond to 64 kbps, 32 kbps, 12.2 kbps, and 5.15 kbps, respectively. The lowest level code (SF=512) provides a very low 1.7 kbps data rate used for short messages, location update, and other sign-on signaling. The theoretical maximum number of simultaneous users at this code is 512 users. Note that if one code occupies 1 branch of the OVSF tree, e.g., at SF32, any codes situated higher than this level cannot be used, i.e., SF16 and SF8 on the same branch cannot be used due to loss of orthogonality.

Congestion on the OVSF code tree due to more users can negatively impact a data user's experience. Such congestion can result in contention, downgrades to existing users, or lost connections to the new/existing users. Such problems can be reduced by properly allocating needed RAB according to appropriate specific application bandwidths. Thus, because specific applications require different specific bandwidths, properly allocating RAB (more generally data rates) to wireless data users according to those different requirements more efficiently utilizes available wireless resources.

Some 3G UMTS RAN vendors assign 64 kbps RAB (radio access bearer) the first time a user gets packet data and up-switches to 128 kbps and then 384 kbps as the needs of the application increase or downgrades the RAB as the needs of the application decrease. However, other approaches simply assign 384 kbps initially and downgrade according to the needs of the application. However, there is currently no awareness of the application that is utilizing the resources. As higher RAB resources are used, the limited numbers of orthogonal codes are used up, which is related to the speed and power consumption of the application. Assume there are many users accessing the data services at the same time and in the same cell site. All the applications may try to reach the maximum 384 kbps RAB, which may not be necessary, depending on the application. Thus, the rest of the data users may not be able to access the desired data service.

However, if the RAN is intelligent enough to know which application requires which radio access bearer and limits each specific application to the appropriate RAB, the RAN can allocate radio resources more efficiently and thus be able to share more revenue from other data users. Thus, for example, a voice over IP (VoIP) application may never require more than 64 kbps and thus should not be allocated 384 kbps. If for some reason a peak usage results in a need for more than 64 kbps, then either an increased allocation of resources could be done for a very short time because the intelligence exists to understand the application has an average requirement at or below 64 kbps and the intelligence could allocate resources appropriately.

Note that other factors such as available base station power, channel element or hardware capability, RAN allocation algorithm, available backhaul, QoS, etc., may also impact data rate allocation to wireless data users.

Figure 1B:
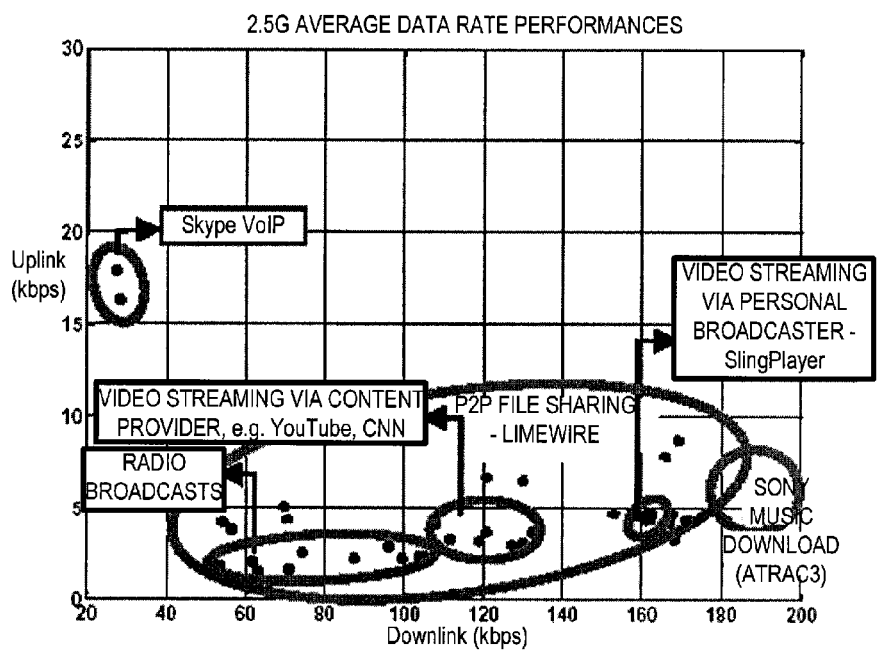
FIG. 1B illustrates exemplary measured average downlink and uplink performances based on sampled applications under various RF conditions for a 2.5G wireless network.

In order to allocate resources according to the data rate requirements of various wireless applications, the data rate requirements of the wireless applications have to be determined. That information can be determined empirically by testing the data rate requirements of various applications. FIGS. 1A and 1B illustrate the measured High-Speed Downlink Packet Access (HSDPA) and Enhanced Data Rates for GSM Evolution (EDGE) downlink and uplink performances based on sampled applications under various RF conditions including good/weak coverage and light/heavy traffic. Also, numerical values of the data shown in FIGS. 1A and 1B are given in the table in FIG. 2, which shows the average throughput for various applications.

FIGS. 1A and 1B show exemplary average uplink and downlink requirements of various applications for 3G and 2.5G respectively. Each data application has specific characteristics or fingerprints in terms of, e.g., bandwidth requirement to complete the uplink and downlink transactions. As described further herein other characteristics may be used to fingerprint wireless applications. Exemplary bandwidth usages for exemplary data networks are shown in the Table 2 below.

TABLE 2

| | Average Application Throughputs (kbps) | | | | Maximum Application Throughputs (kbps) | | | |
|---|---|---|---|---|---|---|---|---|
| | 3G PC Card w/ Laptop | | 2G PC Card w/ Laptop | | 3G PC Card w/ Laptop | | 2G PC Card w/ Laptop | |
| Applications | Downlink | Uplink | Downlink | Uplink | Downlink | Uplink | Downlink | Uplink |
| Email Outlook | 164.5 | 15.1 | 128.5 | 15.1 | 527.9 | 73.8 | 302.1 | 119.3 |

TABLE 2-continued

| | Average Application Throughputs (kbps) | | | | Maximum Application Throughputs (kbps) | | | |
|---|---|---|---|---|---|---|---|---|
| | 3G PC Card w/ Laptop | | 2G PC Card w/ Laptop | | 3G PC Card w/ Laptop | | 2G PC Card w/ Laptop | |
| Applications | Downlink | Uplink | Downlink | Uplink | Downlink | Uplink | Downlink | Uplink |
| Email - Hotmail | 64.2 | 3.8 | 69.9 | 5.1 | 278.6 | 129.5 | 137.8 | 68.6 |
| VoIP | 16.8 | 27 | 28.3 | 16.3 | 50.6 | 40.3 | 55.3 | 38.1 |
| VoIP - w/ Text | 22 | 26 | 27.4 | 17.9 | 79.9 | 37.5 | 46.5 | 62.3 |
| P2P File Sharing (Audio) - | 115.9 | 3.8 | 62.1 | 3.9 | 279 | 20.1 | 152.5 | 32 |
| Video Streaming - | 322.6 | 8.3 | 70.6 | 4.4 | 1210 | 40 | 327.9 | 37.9 |

Once the requirements of the applications are known, the requirements are mapped to allocation of RAB resources. For example, VoIP with average downlink and uplink throughputs of 16.8 and 17 kbps, respectively only requires 32 kbps or 64 kbps RAB allocations for the VoIP to be used on an exemplary 3G data network. P2P file sharing with average downlink and uplink throughputs of 115.9 and 3.8 kbps, respectively, requires a 128 kpbs RAB allocation. The RAB allocations are shown in Table 3 below. Note that the allocations may be based on one or more of average throughput, peak throughput, and minimum throughput. In Table 3, note that average throughput is shown to illustrate exemplary throughputs in comparison to the RAB allocation. Note that because the RAB allocations are relatively coarse, only 384 128, 64, 32, 12.2, 5.15, and 1.7 kbps, are available.

TABLE 3

| Applications | Downlink (kbps) | Uplink (kbps) | RAB Allocation (kbps) |
|---|---|---|---|
| Email - Outlook | 164.5 | 15.1 | 384 |
| Email - Hotmail | 64.2 | 3.8 | 64 |
| VoIP | 16.8 | 27 | 32 |
| VoIP - w/ Text | 22 | 26 | 32 |
| P2P File Sharing (Audio) | 115.9 | 3.8 | 128 |
| Video Streaming - | 322.6 | 8.3 | 384 |

Figure 3:
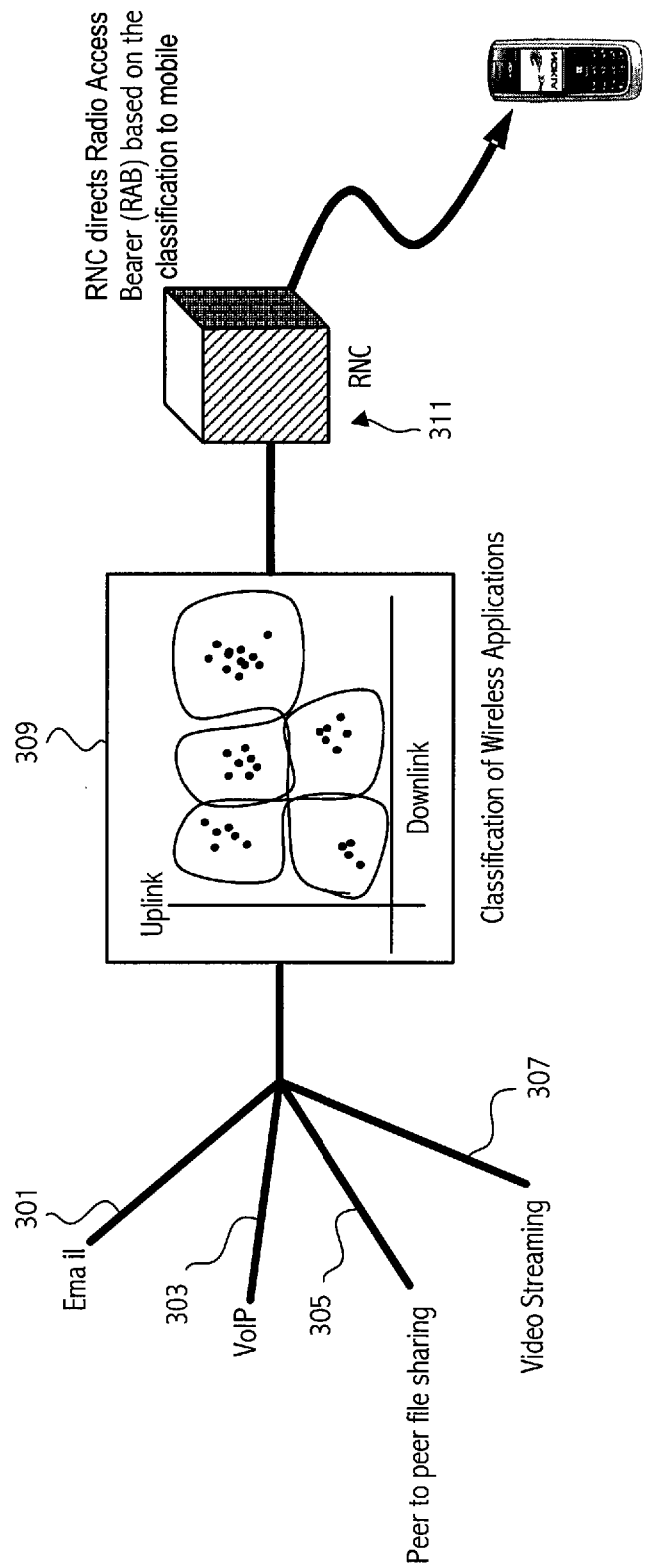
FIG. 3 illustrates how various wireless applications are classified in a classification system and that information is provided into the radio access network (RAN).

FIG. 3 illustrates how various wireless applications such as email 301, voice over internet 303, peer-to-peer filing sharing 305 and video streaming 307 are classified in classification system 309 based on the end-to-end throughput or bandwidth requirements in both downlink and uplink directions of the particular application. The resultant data from the classified applications can be stored in a table such as Table 3. Note that while an embodiment of the invention provides a methodology to classify wireless client bandwidths or fingerprint wireless applications such as VoIP, email, video streaming, peer-to-peer file sharing, etc. based on downlink and uplink throughputs such as shown in Table 3, other characteristics of the applications, discussed further herein may be used as well.

FIG. 3 shows that the classifications are communicated into the RAN. One aspect of the invention is to provide intelligence into the RAN as to the data requirements of wireless applications. The data requirements may be communicated by having RAB allocation corresponding to uplink and/or downlink requirements. When an unknown application is passing through the network, the uplink and downlink throughput of the unknown application are measured. There are many ways to measure throughput. For example a network analyzer that measures throughput may be placed after the RNC, before or after the SGSN (Serving GPRS ((General Packet Radio Service) Support Node), before or after the GGSN (Gateway GPRS Serving/Support Node). The throughput may even be measured at the handset. The measured uplink and downlink throughput of the unknown application is compared to the uplink and downlink throughputs of applications measured offline. When a suitable match is found between the unknown application and the classified applications such as shown in Table 3, the RAB associated with the classified application that most closely matches the unknown application is assigned to the unknown application.

Many different types of matching approaches can be used to compare the measured throughput of the unknown application to the classified applications. For example, in one embodiment a table look-up is performed to map the measured throughput of the unknown application to a table of throughputs and corresponding RAB allocations, such as shown in Table 3. In other embodiments, a neural network is used and the measured uplink and downlink throughputs are utilized as inputs to a neural network to determine the appropriate matching RAB allocation. Fuzzy logic implementations can also be used to match the measured uplink and downlink to a RAB allocated to the closest classified application. Note that one could use a real time moving average of the throughput of the unknown application to compare to the throughputs of previously classified applications.

An advantage of the approach described herein is that embodiments can be implemented that do not require significant additional expenditures. In an embodiment, statistics from hundreds of readily available wireless applications or, alternatively, a few of the most popular ones are gathered. A filter may be added in the radio network controller (RNC) 311 or another server node next to the RNC. That filter can evaluate uplink and downlink throughputs of real time applications, and based on a matching algorithm such as described above, the RNC can allocate bandwidth based on the mapping of the real time application to the appropriate RAB allocated for the closest classified application.

The methodology described herein compliments the QoS feature where the network gives priority and all available bandwidths to higher paying users, e.g., the Gold level customer, and less priority to Silver and Bronze level customers. However, if the application accessed by the Gold level customer does not require the maximum allowable bandwidths to access applications like VoIP, the network does not waste valuable resources and in turn provides more efficient bandwidth sharing and increased revenue.

In the past, RAN resources were not used effectively to decide which RAB is suitable for which data application. Certain networks may not implement QoS, and even if it QoS is implemented, the approach described herein compliments QoS and makes greater effective use of resources. Presently, the resource sharing/allocation is not critical, but as data traffic reaches maturity and more users vie for bandwidth, an immediate solution as described herein more effectively allocates bandwidth without significant extra capital spending.

Utilization of the invention described herein not only makes efficient use of radio resources, but it also allows for significant bandwidth requirement knowledge to plan, design or predict network requirements and ensure network quality as the network becomes more mature.

While in one embodiment of the invention uplink and/or downlink throughput is utilized as the characteristic to identify the unknown application, other characteristics can be utilized instead of, or in conjunction with the uplink and/or downlink throughput of the unknown wireless application to identify the unknown application utilizing the wireless network.

For example, many wireless applications use a protocol in which the triplet (source, destination, and port number) are utilized. Any or all of the information in the triplet can be utilized to identify the application. For example, when a source address or destination address is associated with a video content provider, such information can be used to identify the application as one having specific bandwidth requirements corresponding to a video application. Similarly, port numbers have long been associated with particular applications. Thus, rather than looking solely at uplink/downlink throughput, the source, destination, and port number information can also be examined instead of, or in conjunction with uplink/downlink throughput. Other indicia of the application may be ascertainable from the packets. For example, the size of the packets or the number of packets may be indicative of a particular wireless application. For example, VoIP uses a small number of packets while FTP (File Transfer Protocol) utilizes a large amount of packets. In addition, the transport mechanism utilized, e.g., TCP/IP (Transmission Control Protocol/Internet Protocol) as opposed to User Datagram Protocol (UDP), may help identify the unknown wireless application and thus its wireless resource requirements. In addition, the larger number of characteristics that can be associated with an unknown wireless application, the greater the chances of accurately matching the unknown wireless application to a wireless application that has been characterized for bandwidth requirements based on its characteristics. Thus, for example, the larger the number of characteristics of an unknown wireless application on the network that are available, e.g., uplink and downlink throughput, source, destination, port number, transport mechanism, packet length, number of packets, etc., the more likely that an accurate best match will be found in the already classified wireless applications and network resources will be accurately allocated to the application.

Figure 4:
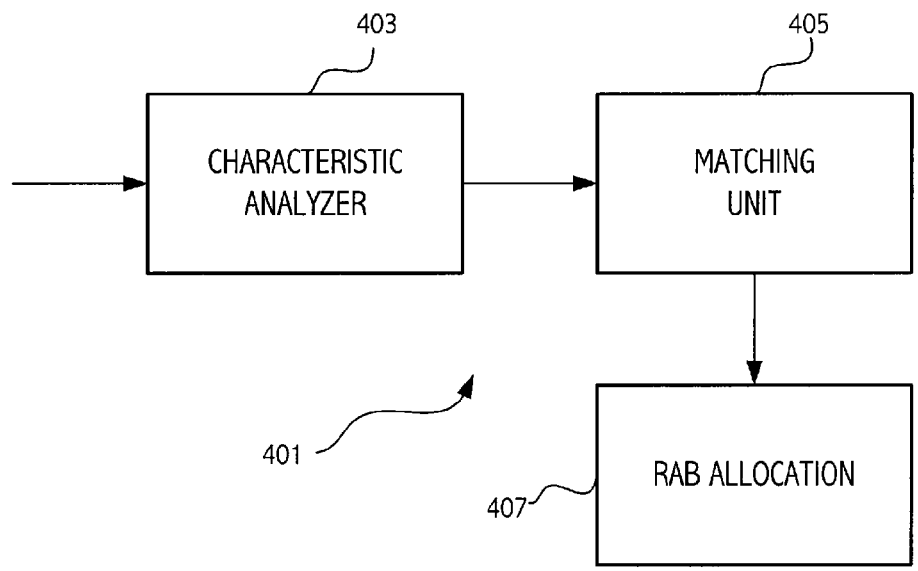
FIG. 4 illustrates a functional block diagram of aspects of a radio network controller (RNC) according to an embodiment of the invention.

Referring to FIG. 4, illustrated is a functional block diagram of aspects of a radio network controller (RNC) 401 according to an embodiment of the invention. The functionality may be incorporated into hardware and/or software of the radio network controller or portions of the functionality may be implemented in additional hardware/software (e.g., a server) operating in conjunction with the RNC. Functionally, the characteristic analyzer extracts the one or more characteristics that are used to identify the unknown application. That characteristic may be one or more of uplink/downlink throughput, destination/source/port number, transport protocol, etc., as described above. The particular nature of the analyzer will depend on the functionality required. For example, the analyzer 403 may simply extract the triplet (or portion thereof) from the appropriate packet in a packet stream. The analyzer may function as preexisting functionality in the RNC to determine uplink/downlink throughput. Transport protocol analysis analyzes packets to determine the protocol being utilized, which is readily identifiable from the packet stream.

Once the characteristic of the unknown application is extracted, it is provided to a match unit 405, which functions to compare the extracted characteristic to those of previously classified applications. Thus, for example, match unit 405 may functionally include a look-up table, and software to compare the extracted characteristic characteristics stored in the table. Note that an exact match is not required but one that is sufficiently close, e.g., to the characteristic of the previously classified application. Note that the proximity of the characteristic of the unknown application to the characteristic of the classified application in order to be considered a match may vary widely depending on the characteristic being analyzed, and the requirements of the system. In some instances, an exact match may be required. As stated earlier the match unit 405 may also be implemented as a neural network, which may be advantageous when a larger number of characteristics are being utilized to find a match. A fuzzy logic implementation is also possible.

Figure 5:
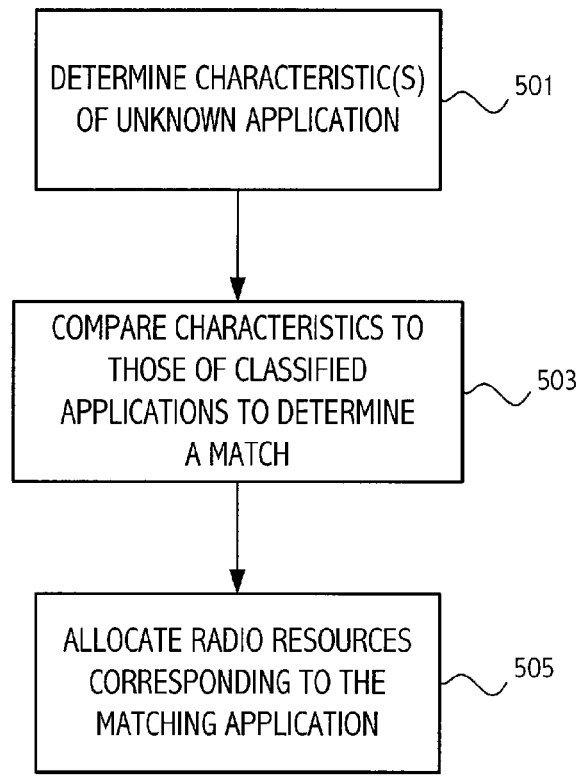
FIG. 5 illustrates an exemplary flow diagram of an embodiment of the invention.

Once the match is found in 405, the RAB allocation corresponding to the match may be communicated to RAB allocation 407 to allocate the appropriate bandwidth to the unknown application in a manner known in the art Referring to FIG. 5, illustrated is an exemplary flow diagram of an embodiment of the invention. In 501 the RNC or associated functionality determines the one or more characteristics of an unknown application being utilized on the wireless network. The various types of characteristics that may be extracted from the unknown wireless application in order to identify it are described above. Once the appropriate characteristics are identified, the identified characteristic(s) are compared to characteristics of previously classified applications in 503 and a match is found. Finally, in 505 the radio resource allocation, e.g., RAB allocation, is made based on the match. That is, the radio resource requirements of the previously classified application that match the unknown application are utilized as the basis to allocate radio resources to the unknown application.

While various aspects of the invention have been described herein, note that the description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method for use in a wireless network comprising:
   determining a plurality of characteristics of an unknown wireless application utilizing the wireless network, the plurality of characteristics including measured uplink and downlink throughputs;
   determining a most closely corresponding match of the plurality of characteristics including the uplink and downlink throughputs of the unknown wireless application to characteristics, including uplink and downlink throughputs, of one of a plurality of previously classified wireless applications; and allocating radio resources in the wireless network according to the most closely corresponding match.

2. The method as recited in claim 1 further comprising determining as one of the plurality of characteristics of the unknown wireless application one of destination, source, or port number associated with the unknown wireless application.

3. The method as recited in claim 2 further comprising determining another of the plurality of characteristics of the unknown wireless application from one or more packets transmitted as part of the wireless application.

4. The method as recited in claim 1 further comprising determining at least one of the plurality of characteristics of the unknown wireless application from at least one of size or number of the one or more packets in a data payload of the wireless application.

5. The method as recited in claim 1 wherein the allocation of radio resources is used in conjunction with allocation of radio resources based on quality of service (QoS).

6. The method as recited in claim 1, wherein the radio resources allocated are radio access bearer (RAB) allocations.

7. The method as recited in claim 1 wherein the radio resources are time slots.

8. The method as recited in claim 1 wherein another of the plurality of characteristics of the unknown wireless application is a transport mechanism utilized by the unknown wireless application.

9. The method as recited in claim 1 further comprising utilizing a look-up table to determine the most closely corresponding match.

10. The method as recited in claim 1 further comprising using a neural network to determine the most closely corresponding match.

11. The method as recited in claim 1 further comprising using a real time moving average of the uplink and downlink throughputs to compare to the uplink and downlink throughputs of the previously classified applications to determine the most closely corresponding match.

12. A radio network controller comprising:

a computer-implemented characteristic analyzer to determine a plurality of characteristics of an unknown wireless application that is utilizing the wireless network, the characteristics including measured uplink and downlink throughputs associated with the unknown wireless application;

a computer-implemented matching unit operable to determine a match between the characteristics of the unknown wireless application including the measured uplink and downlink throughputs and characteristics, including uplink and downlink throughputs, of one of a plurality of previously classified wireless applications; and a radio resource allocator unit responsive to the match to one of the previously classified applications to allocate radio resources in the wireless network to the unknown wireless application according to the match.

13. The wireless network as recited in claim 12 wherein one of the plurality of characteristics of the unknown wireless application is one of destination, source, or port number associated with the unknown wireless application.

14. The wireless network as recited in claim 12 wherein the characteristic analyzer is operable to determine one of the plurality of characteristics of the unknown wireless application from one or more packets transmitted as part of the unknown wireless application.

15. The wireless network as recited in claim 12 wherein one of the plurality of characteristics of the unknown wireless application is determined from size or number of the one or more packets in a data payload of the wireless application.

16. The wireless network as recited in claim 12, wherein the radio resources allocated are radio access bearer (RAB) allocations.

17. The wireless network as recited in claim 12 wherein the radio resources allocated are time slots.

18. The wireless network as recited in claim 12 wherein one of the plurality of characteristics of the unknown wireless application is a transport mechanism utilized by the unknown wireless application.

19. The wireless network as recited in claim 12 wherein the matching unit includes a look-up table storing characteristics associated with previously classified applications.

20. The wireless network as recited in claim 12 wherein the matching unit comprises a neural network to receive the plurality of characteristics of the unknown wireless application and supply an indication of the match.

* * * * *